(12) United States Patent
Jiang et al.

(10) Patent No.: US 8,888,479 B2
(45) Date of Patent: Nov. 18, 2014

(54) MOLDING DEVICE WITH CUTTING MECHANISM

(71) Applicants: Hong Fu Jin Precision Industry (ShenZhen) Co., Ltd., Shenzhen (CN); Hon Hai Precision Industry Co., Ltd., New Taipei (TW)

(72) Inventors: Fang Jiang, Shenzhen (CN); Fa-Ye Li, Shenzhen (CN); Shun-Bai Wu, Shenzhen (CN); Peng Tan, Shenzhen (CN); Yang Bi, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 51 days.

(21) Appl. No.: 13/741,494

(22) Filed: Jan. 15, 2013

(65) Prior Publication Data

US 2013/0280361 A1   Oct. 24, 2013

(30) Foreign Application Priority Data

Apr. 23, 2012  (CN) .......................... 2012 1 0119778

(51) Int. Cl.
*B29C 45/38* (2006.01)
*B26D 7/26* (2006.01)
*B26D 1/08* (2006.01)
*B29C 45/00* (2006.01)
*B26F 1/44* (2006.01)

(52) U.S. Cl.
CPC .......... *B29C 45/0053* (2013.01); *B26D 7/2614* (2013.01); *B26F 2001/4427* (2013.01); *B26D 1/08* (2013.01); *B26F 2210/06* (2013.01); *B29C 45/38* (2013.01); *B26D 2007/2685* (2013.01)
USPC ....................................... 425/218; 83/698.11

(58) Field of Classification Search
CPC ....................................................... B29C 45/38
USPC ....................................... 425/218; 83/689.11
See application file for complete search history.

(56) References Cited

U.S. PATENT DOCUMENTS 4,380,423 A * 4/1983 Aoki .............................. 425/289
5,324,052 A * 6/1994 Ortmann .......................... 279/83

* cited by examiner

*Primary Examiner* — Alison Hindenlang
(74) *Attorney, Agent, or Firm* — Novak Druce Connolly Bove + Quigg LLP

(57) ABSTRACT

A molding device includes a male die, a master die core, a male die core located between the male die and the master die core, and a cutting mechanism received in the male die core. The cutting mechanism includes a cutting seat and a cutter. The cutting seat defines a latch slot. The latch slot includes a narrow portion and a wide portion communicating with the narrow portion. The cutter includes a plate body received in the narrow portion and a latch shaft located on the plate body. The latch shaft is engaged in the wide portion. When a plastic product is formed and a sprue gate is around the mold cavity, the plate body is configured to cut the sprue gate, and the plate body is movable relative to the cutting seat around the latch shaft, to prevent the plate body from sticking.

16 Claims, 7 Drawing Sheets

MOLDING DEVICE WITH CUTTING MECHANISM

BACKGROUND

1. Technical Field

The present disclosure relates to molding devices, and a molding device with a cutting mechanism.

2. Description of Related Art

To manufacture plastic products, plastic in liquid form is injected into a mold cavity. The molten plastic hardens as it is cooled in the mold cavity to form the product. Excess plastic known as flash may be attached to the product after molding. A sprue gates is formed in the mole cavity. The sprue gates are often manually cut or ground away after the plastic is ejected out of the mold cavity. This can be time-consuming and prone to human errors. The product may be damaged if the mold cavity is not removed properly. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
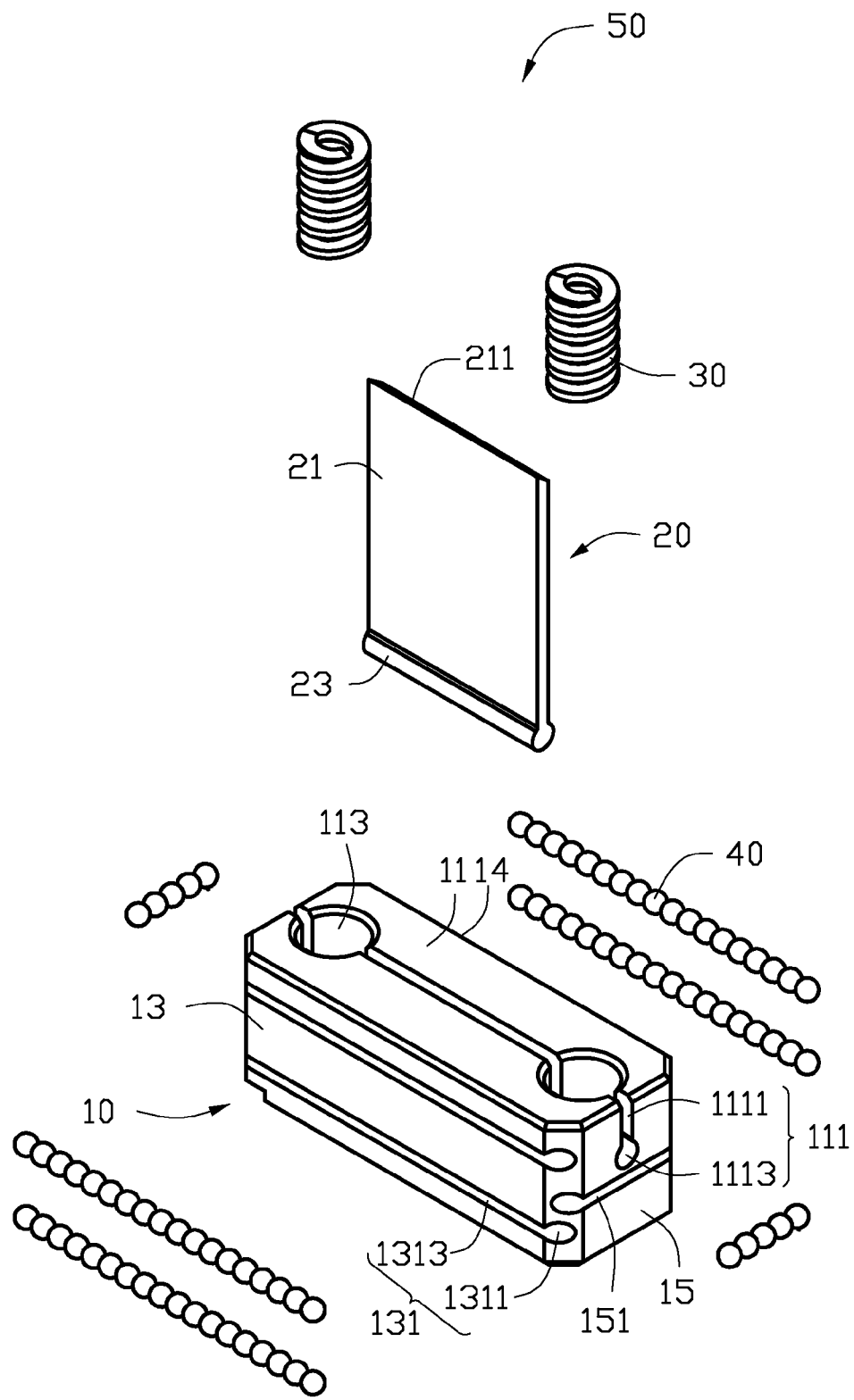
FIG. 1 is an isometric exploded view of a cutting mechanism in one embodiment.

FIG. 1 shows a cutting mechanism in accordance with an embodiment. The cutting mechanism 50 includes a cutting seat 10, a cutter 20 rotatably engaged in the cutting seat 10, two elastic members 30 received in the cutting seat 10, and a plurality of balls 40 attached to the cutting seat 10.

The cutting seat 10 includes a top wall 11, a front wall 13, a rear wall 14, and two sidewalls 15. The cutting seat 10 defines an elongated latch slot 111 extending to the top wall 11 and the two sidewalls 15. The latch slot 111 includes a narrow portion 1111 and a wide portion 1113 communicating with the narrow portion 1111. A width of the wide portion 1113 is greater than a width of the narrow portion 1111. The wide portion 1113 has an inner wall, and the inner wall is substantially arc-shaped. The cutting seat 10 defines two receiving slots 113 extending to the top wall 11, to receive the two elastic members 30. The two receiving slots 113 are adjacent to the two sidewalls 15, respectively. The latch slot 111 extends through a center of each of the two receiving slots 113.

Each of the front wall 13 and the rear wall 14 defines two first engaging slots 131. Each of the two sidewalls 15 defines a second engaging slot 151. The two first engaging slots 131 and the second engaging slot 151 have a same configuration, and each of the two first engaging slots 131 and the second engaging slot 151 includes an engaging portion 1311 and a cutout 1313 communication with the engaging portion 1311.

The cutter 20 includes a plate body 21 and a latch shaft 23 located on the plate body 21. The plate body 21 is rectangular. The latch shaft 23 is substantially columnar and has a cross-section. A thickness of the plate body 21 is smaller than a diameter of the cross-section of the latch shaft 23. The latch shaft 23 is located on a first end of the plate body 21, and a second end opposite to the first end of the plate body 21 defines a cutting edge 211.

Figure 2:
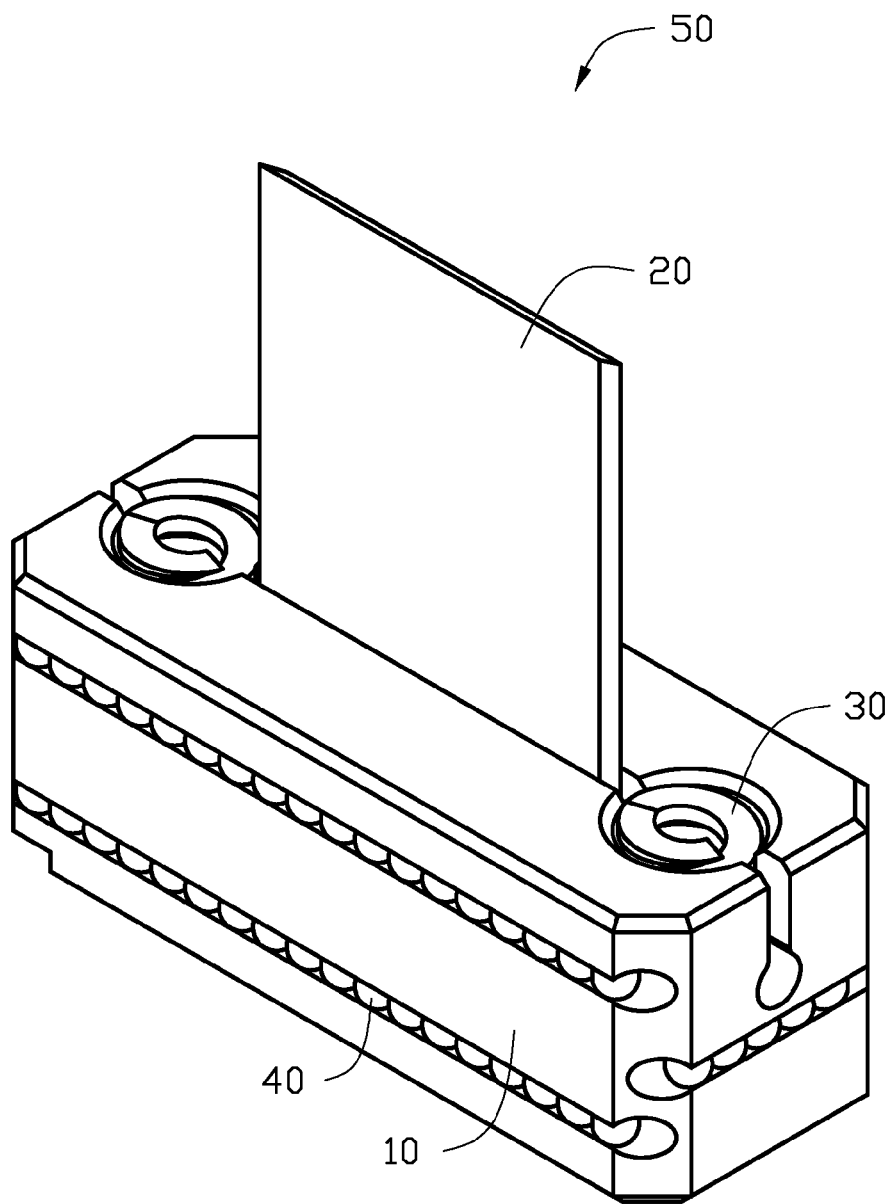
FIG. 2 is an assembled view of the cutting mechanism of FIG. 1.
Figure 3:
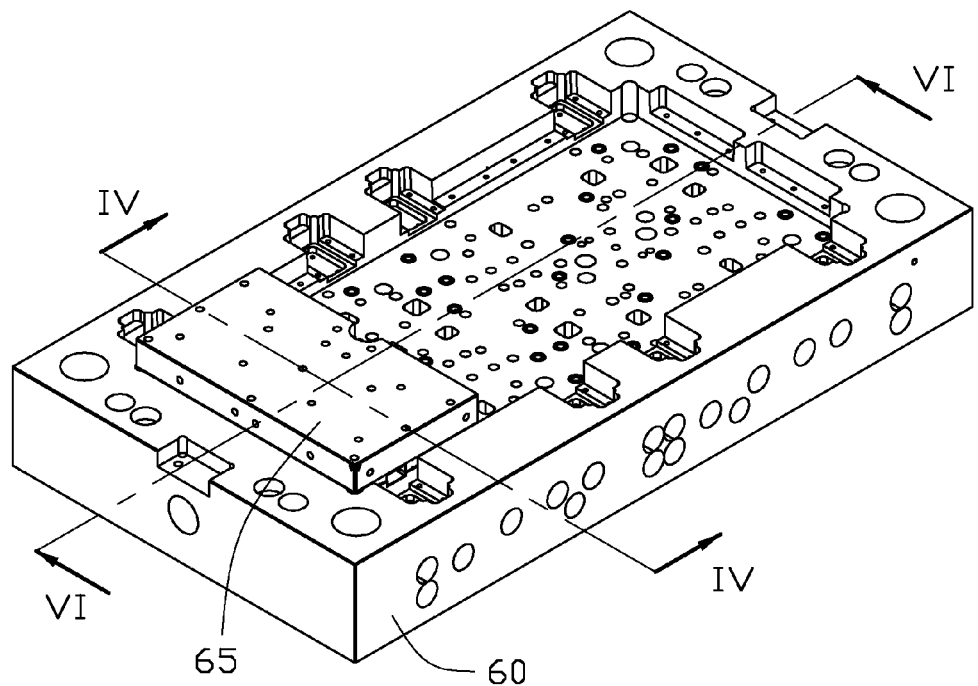
FIG. 3 is an isometric view of a molding device in one embodiment.
Figure 4:
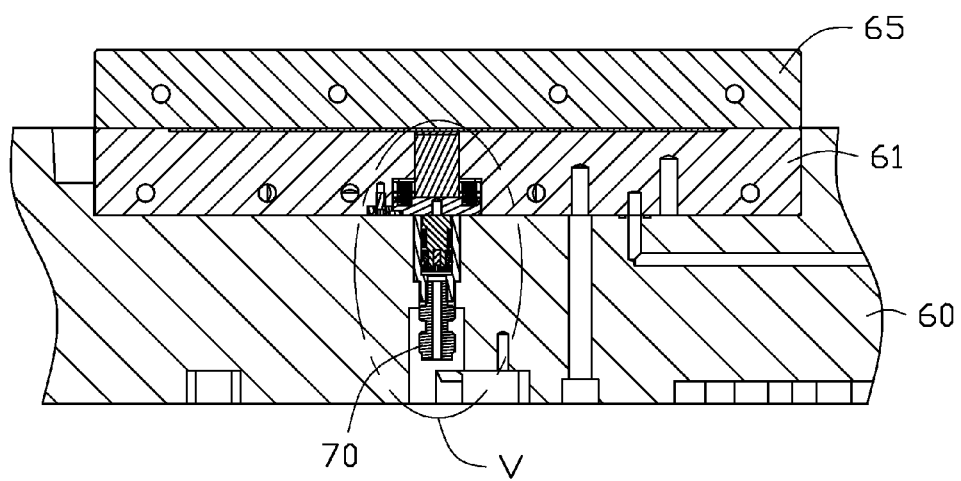
FIG. 4 is a cutaway, cross-sectional view of the molding device of FIG. 3, taken along the line IV-IV.
Figure 5:
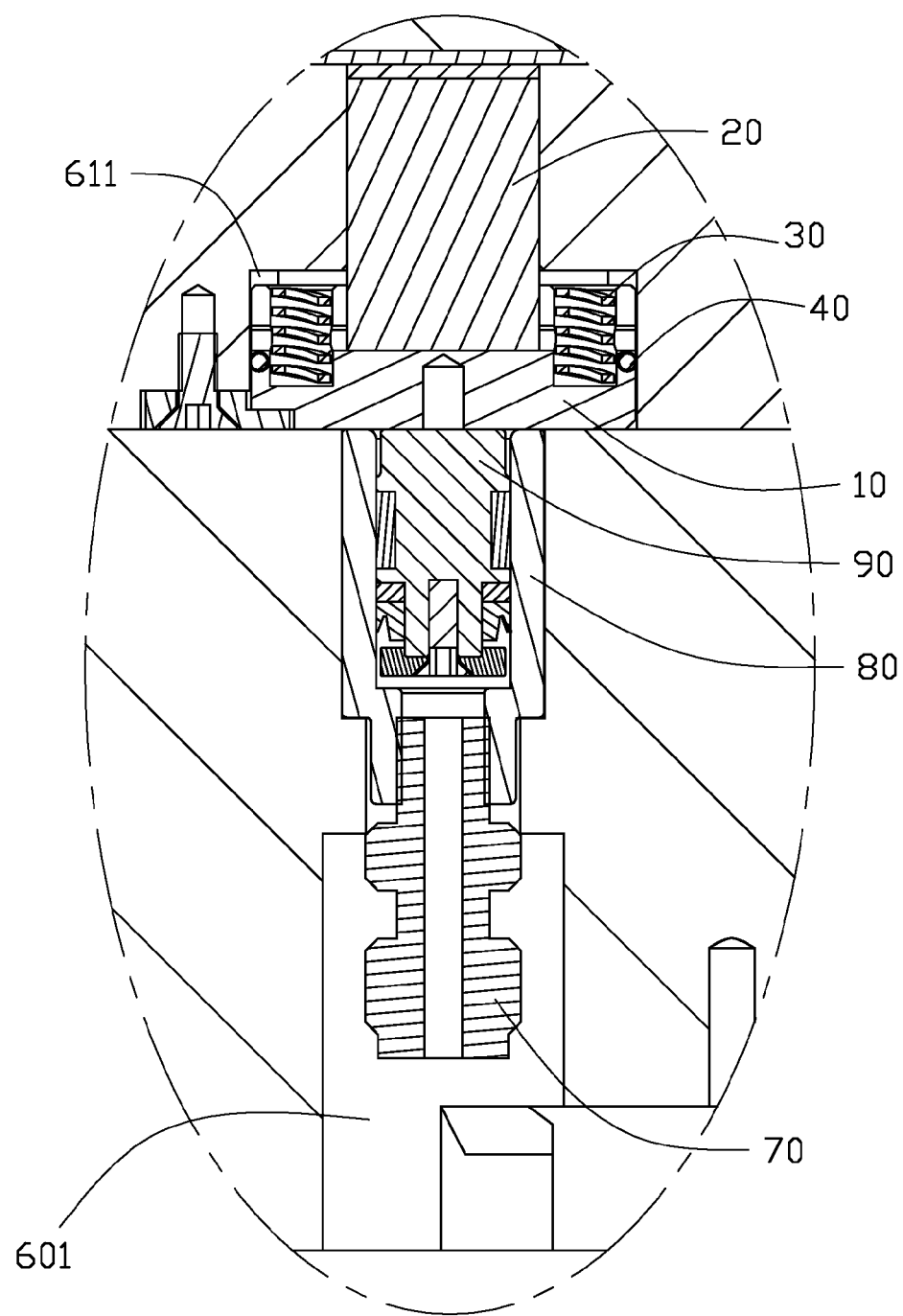
FIG. 5 is an enlarged view of the circled portion V of FIG. 4.
Figure 6:
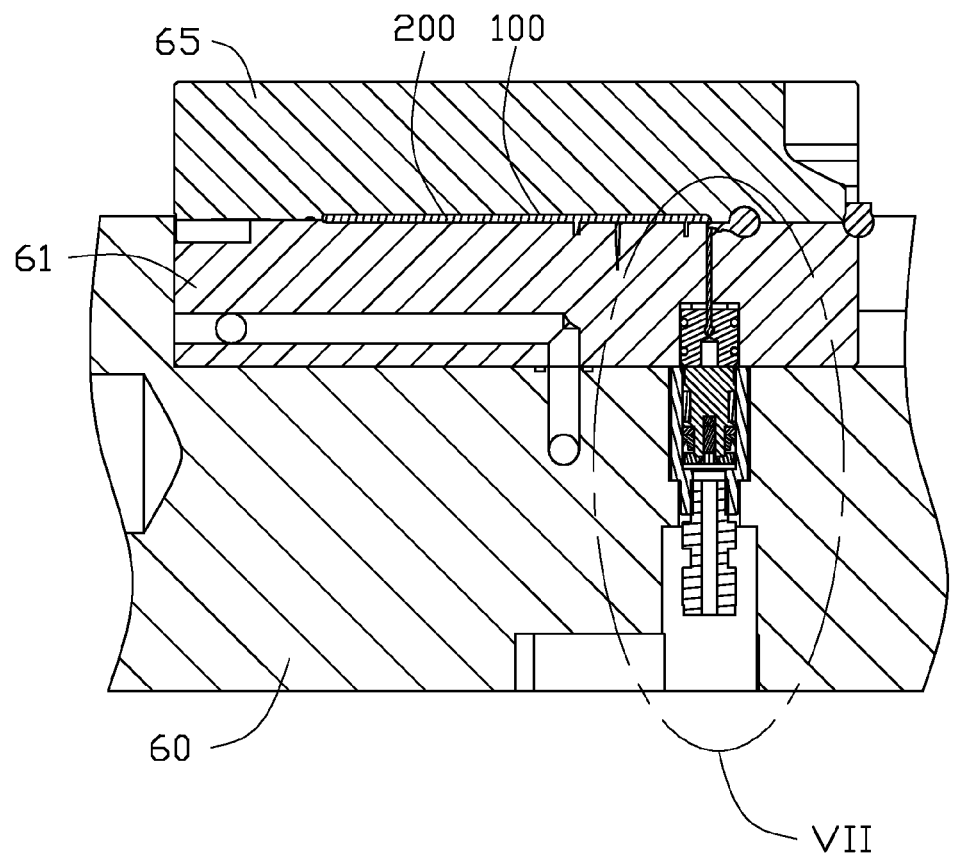
FIG. 6 is a cutaway, cross-sectional view of the molding device of FIG. 3, taken along the line VI-VI.
Figure 7:
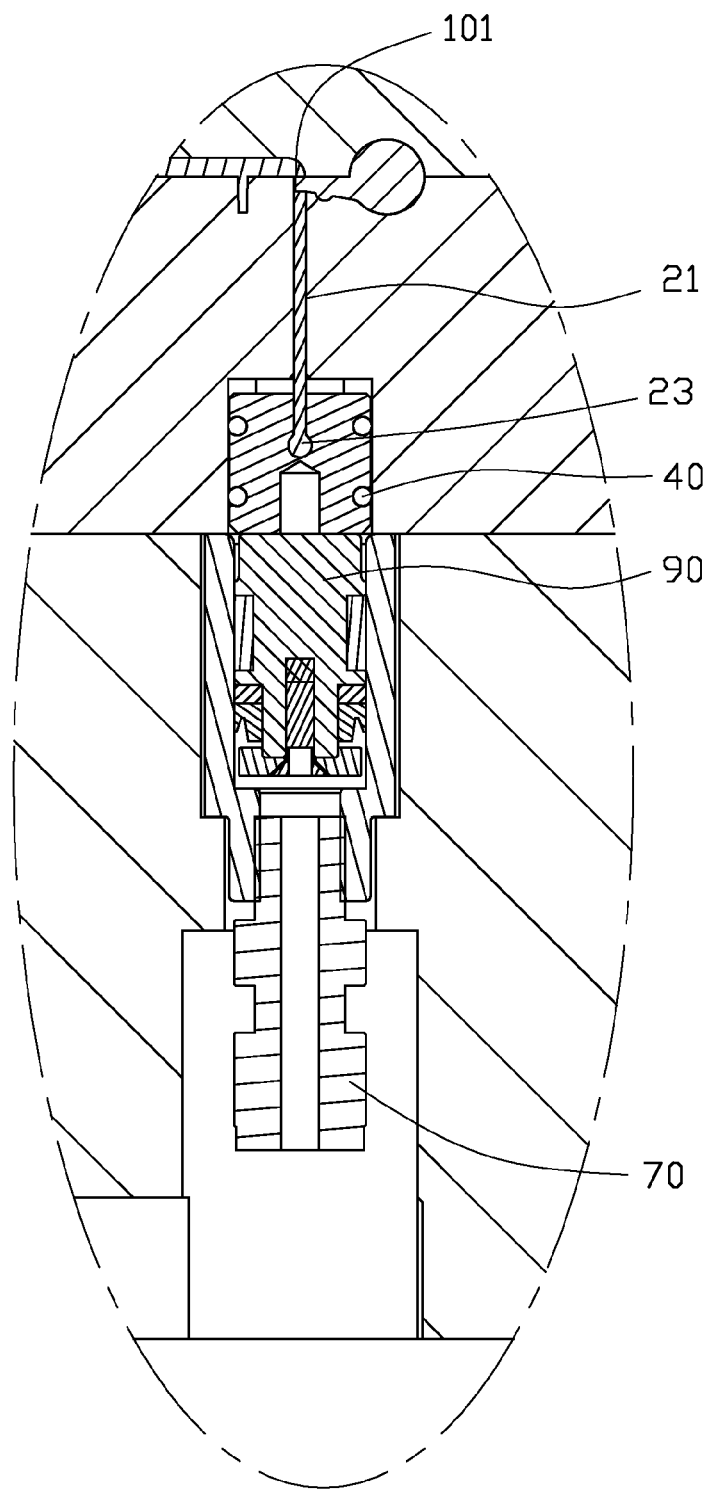
FIG. 7 is an enlarged view of the circled portion VII of FIG. 6.

Referring to FIG. 2, in assembly, the latch shaft 23 of the cutter 20 is aligned with the wide portion 1113 of the latch slot 111, and the plate body 21 is aligned with the narrow portion 1111 of the latch slot 111. The cutter 20 is moved towards the cutting seat 10, until the latch shaft 23 is received in the wide portion 1113. A part of the plate body 21 is received in the narrow portion 1111 and another part of the plate body 21 extends out of the cutting seat 10. The cutter 20 can swing relative to the cutting seat 10, around the latch shaft 23. An outer surface of the latch shaft 23 abuts against an inner surface of the wide portion 1113. The two elastic members 30 are received in the two receiving slots 113, respectively. One end of each of the two elastic members 30 is attached to a bottom wall of each of the two receiving slots 113, and another end of the two elastic members 30 extends out of the cutting seat 10.

Each of the balls 40 is engaged in the engaging portion 1311. After each of the two first engaging slots 131 and the second engaging slot 151 is full with the balls 40, two side ends of each of the two first engaging slots 131 and the second engaging slot 151 are weld, to prevent the balls 40 from disengaging from the corresponding engaging slot. The cutting mechanism 50 is thereby assembled completely.

Referring to FIGS. 3-7, the cutting mechanism 50 is applied to a molding device in one embodiment. The molding device further includes a male die 60, a male die core 61, a master die core 65, an oil connection 70, an oil body 80, and a piston module 90. The male die 60 defines an installation hole 601. The male die core 61 is sandwiched between the male die 60 and the master die core 65 and defines a through hole 611 corresponding to the installation hole 601. The male die core 61 and the master die core 65 cooperatively define a mold cavity 100. One end of the oil connection 70 is secured to the oil body 80 and received in the installation hole. The piston module 90 is received in the oil body 80 and abuts against a bottom portion of the cutting mechanism 50. The cutting mechanism 50 is received in the through hole 611. The cutting edge 211 of the cutting mechanism 50 is adjacent to the mold cavity 100 and the plurality of balls 40 abuts the sidewalls of the through hole 611.

After plastic, in liquid form, is injected into the mold cavity 100, a plastic product 200 is formed. A sprue gate 101 of the plastic product 200 requires cutting. Oil is injected into the oil connection 70, to move the piston module 90. The piston module 90 pushes the cutting seat 10, the two elastic members 30 are resiliently deformed to abut a top wall of the through hole 611. The plurality of balls 40 of the cutting mechanism 50 abut against the sidewalls of the through hole 611 to decrease friction force between the cutting seat 10 and the sidewalls of the through hole 116. The cutting seat 10 biases the cutter 20 to cut the gate mark. After the gate mark is cut, the oil connection 70 will stop injecting oil. The plate body 21 is movable relative to the cutting seat 10 around the latch shaft 23, to prevent the cutting edge 211 from sticking with the sprue gate 101. The two elastic members 30 rebound to move the cutter 20 to disengage the cutting edge 211 from the sprue gate 101.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A cutting mechanism comprising:
   a cutting seat, the cutting seat comprising a top wall and defines a latch slot extending to the top wall, the latch slot comprises a narrow portion and a wide portion in communication with the narrow portion; and
   a cutter, the cutter comprises a plate body and a latch shaft located on the plate body;
   wherein a part of the plate body is received in the narrow portion, and another part of the plate body extends out of the cutting seat, the latch shaft is engaged in the wide portion, and the plate body is movable relative to the cutting seat, around the latch shaft.

2. The cutting mechanism of claim 1, wherein the wide portion comprises an inner wall, and the latch shaft abuts against the inner wall.

3. The cutting mechanism of claim 2, wherein the inner wall is substantially arc-shaped, and the latch shaft is substantially columnar.

4. The cutting mechanism of claim 1, further comprising two elastic members, wherein the cutting seat defines two receiving slots extending to the top wall, and each of the two elastic members is received in each of the two receiving slots.

5. The cutting mechanism of claim 4, wherein the latch slot extends through a center of each of the two receiving slots.

6. The cutting mechanism of claim 1, further comprising a plurality of balls; wherein the cutting seat comprises a front wall, a rear wall, and two sidewalls; and each of the front wall and the rear wall defines a first engaging slot, each of the two sidewalls defines a second engaging slot, and the plurality of balls are engaged in the first engaging slot and the second engaging slot.

7. The cutting mechanism of claim 6, wherein each of the first engaging slot and the second engaging slot comprises an engaging portion and a cutout extending to the engaging portion; and the plurality of balls are engaged in the engaging portion and extend out of the cutting seat through the cutout.

8. A molding device comprising:
   a male die;
   a male die core defining a through hole;
   a master die core, the master die core and the male die core cooperatively defining a mold cavity; and
   a cutting mechanism being received in the through hole, the cutting mechanism comprising:
      a cutting seat, the cutting seat comprises a top wall and defines a latch slot extending to the top wall, the latch slot comprises a narrow portion and a wide portion in communication with the narrow portion; and
      a cutter, the cutter comprising a plate body and a latch shaft located on the plate body;
   wherein the male die core is located between the male die and the master die core, the plate body is received in the narrow portion, the latch shaft is engaged in the wide portion; when a plastic product is formed in the mold cavity and a sprue gate is around the mold cavity, the plate body is configured to cut the sprue gate, and the plate body is movable relative to the cutting seat around the latch shaft, to prevent the plate body from sticking with the sprue mark.

9. The molding device of claim 8, wherein the wide portion comprises an inner wall, and the latch shaft is against the inner wall.

10. The molding device of claim 9, wherein the inner wall is substantially arc-shaped, and the latch shaft is substantially columnar.

11. The molding device of claim 8, further comprising two elastic members, wherein the cutting seat defines two receiving slots extending to the top wall, and each of the two elastic members is received in each of the two receiving slots.

12. The molding device of claim 11, wherein the latch slot extends through a center of each of the two receiving slots.

13. The molding device of claim 8, further comprising a plurality of balls, wherein the balls abut inner sidewalls of the through hole, to decrease friction force between the cutting seat and the male die core.

14. The molding device of claim 13, wherein the cutting seat comprises a front wall, a rear wall, and two sidewalls; each of the front wall and the rear wall defines a first engaging slot, and each of the two sidewalls defines a second engaging slot, and the plurality of balls are engaged in the first engaging slot and the second engaging slot, respectively.

15. The molding device of claim 14, wherein each of the first engaging slot and the second engaging slot includes an engaging portion and a cutout in communication with the engaging portion, the plurality of balls are engaged in the engaging portion, and extend out of the cutting seat through the cutout.

16. The molding device of claim 8, further comprising an oil body, a piston module, and an oil connection, wherein the male die defines an installation hole in communication with the through hole, the oil body is received in the installation hole, the oil connection is secured to the oil body, and the piston module is received in the oil body and abuts the cutting seat.

* * * * *